United States Patent [19]
Küppers et al.

[11] Patent Number: 4,797,201
[45] Date of Patent: Jan. 10, 1989

[54] ELECTROSTATIC FREE-FALL SEPARATOR

[75] Inventors: Helmuth Küppers; Hans-Jürgen Knauer, both of Kassel, Fed. Rep. of Germany

[73] Assignee: Kali und Salz Aktiengesellschaft, Kassel, Fed. Rep. of Germany

[21] Appl. No.: 531,597

[22] Filed: Sep. 12, 1983

[30] Foreign Application Priority Data

Sep. 10, 1982 [DE] Fed. Rep. of Germany ....... 3233528

[51] Int. Cl.4 .............................................. B03C 7/12
[52] U.S. Cl. ................................. 209/127.4; 209/129
[58] Field of Search ............................. 209/127–130, 209/212–214

[56] References Cited

U.S. PATENT DOCUMENTS

| 3,031,079 | 4/1962 | Boss | 209/128 |
| 3,370,703 | 2/1968 | Carpenter | 209/127 R |
| 3,493,109 | 2/1970 | Carta et al. | 209/127 R |
| 3,581,886 | 6/1971 | Singewald et al. | 209/127 C |
| 4,116,822 | 9/1978 | Webb | 209/127 R |
| 4,326,951 | 4/1982 | Broz | 209/127 C |

FOREIGN PATENT DOCUMENTS

| 65536 | 5/1913 | Switzerland | 209/127 C |
| 26802 | of 1913 | United Kingdom | 209/129 |

*Primary Examiner*—David L. Lacey
*Attorney, Agent, or Firm*—Michael J. Striker

[57] ABSTRACT

An electrostatic free-fall separator has roller-shaped field electrodes which are formed as hollow rollers closed at both their ends without forming sharp edges and having horizontally extending longitudinal axes arranged at a field distance parallel to one another.

6 Claims, 1 Drawing Sheet

ELECTROSTATIC FREE-FALL SEPARATOR

BACKGROUND OF THE INVENTION

The present invention relates to an electrostatic free-fall separator.

For electrostatic separation of mixtures of fine particle materials which, as for example crude potassium salt, have an extremely low electrical conductivity, these mixtures are triboelectrically charged with opposite charges relative to one another by active movement of individual particles, in some cases with preceding chemical conditioning, with maintenance of certain temperatures and air moisture. Because of the active movement, the particles of the individual components of the mixture strike against one another, electrons are transferred for one particles to the others, and opposite charging of these particles takes place.

The specific electrostatic separation takes place in so-called free-fall separators which have an inlet device for the mixture to be separated, two plate electrodes arranged parallel to and at a distance from each other, and separating tongues for preventing mixing of the separated material. The mixture to be separated is supplied through the inlet device into the electrostatic field which is generated by the electrodes and acts so that the free fall of the charged particles of the mixture to be separated is deflected to the oppositely charged electrodes. The stream of the separated material which has been spread in such a manner is subdivided with the aid of the separating tongues into sections enriched in their material content and into intermediate material.

After a short time, fine particles of the mixture deposit with charge compensation on the mutually facing surfaces of the plate electrodes and weaken because of their low electrical conductivity the strength of the electric field, and therefore the separating action of the separator is weakened. In connection with this it has been proposed in the German Pat. No. 1,154,052 to use instead of the plates a plurality of normally arranged electrodes which has the shape of elongated rollers and held in constant rotation about their longitudinal axes. In this manner it is possible to continuously mechanically remove the fine particles of the material deposited on the electrode surfaces outside of the electrical field. With such small distance of these roller-shaped electrodes in the same charging condition near one another, they have approximately the same action relative to the electrical field as the plate electrodes. Whereas in homogeneous fields in air theoretically a field strength up to 30 kV/cm without sparkover can be formed, the electrical field between the electrodes formed by a plurality of elongated rods, particularly at the edges, is strongly inhomogeneous, and as a result only relatively small field strengths of for example 4.5 kV/cm are obtained for elimination of sparkovers between these electrodes.

The vertical position of the plate electrodes or the plurality of electrodes in the shape of rolls has the advantage that the reaction time of the electrical field onto the particles of the material which passes in free fall through this electrical field is great and the separation effect is improved. However, the great fall heights in the separator of this construction require arrangements of high technical costs.

SUMMARY OF THE INVENTION

Accordingly, it is an object of the present invention to provide an electrostatic free-fall separator which avoids the disadvantages of the prior art.

More particularly, it is an object of the present invention to provide an electrostatic free-fall separator which with a horizontally directed electrical field has a high field strength in that with a small fall height of the material to be separated inside the electronic field, a higher separation effect is obtained.

The electrostatic free-fall separator for separation of mixtures of materials having low electrical conductivity, particularly mineral materials, is of a type in which a horizontally directed electrical high-voltage field is generated between field electrodes which are arranged parallel at a distance from one another and are rotatable and roller-shaped, wherein the electrodes are provided outside of the electrical field with stripping devices, and the separator is provided at its head with an inlet device for the material and at its bottom with separating tongues adjustable in their inclination.

In accordance with the present invention, the roller-shaped electrodes of the free-fall separator are formed as cylindrical rollers without edges at both their ends e.g. with semispherical cups and arranged with their horizontally directed longitudinal axes at the same side parallel to one another.

In accordance with another feature of the present invention, the field distance of the electrodes is advantageously as small as possible; however, at most it is equal to the electrode diameter, inasmuch as the greater is the ratio of the roller radius to the roller distance, the greater is the field strength obtainable up to the sparkover.

The electrical field generated in the inventive free-fall separator has the advantage that the field strength between the electrodes in air medium can be increased up to 14 kV/cm without sparkover and therefore timewise collapse of the electrostatic field.

For continuously maintaining the electrostatic field of high field strength in the free-fall separator in accordance with the present invention, it is important to avoid the sparkovers between the electrodes. The spherical cups arranged on the electrode ends serve particularly for this purpose, since they form an edge-free closure of the electrodes. Instead of these spherical cups, other closure forms can be selected which guarantee an edge-free closure.

For the same reason, the correct mounting, bearing and driving points which are in connection with the electrodes are provided advantageously with corona-protective devices so as to prevent a point discharge.

The electrodes can be composed of a suitable metal or of a material which is coated with an electrically conductive layer. They are advantageously supported rotatable about their longitudinal axes and can be driven in uniform rotation by a drive such as by a rotatable shaft of an insulating material. In this way, it is possible to continuously mechanically remove dust adhering to the electrode surfaces by brushes or scrapers arranged at a side facing away from the field. The stripping devices required for this are advantageously formed so that they abut against the spherically shaped parts of the electrodes and clean them from the adhered dust of the seprating material. The dust adhering to the electrode surface leads to a weakening of the electrostatic field and the separating action of the electrostatic free-fall separator or to a reduction of the breakdown field strength. It is therefore advantageous to strip off the separating material dust also in the region of the spherical parts of the electrodes.

With the electrostatic free-fall separator in accordance with the present invention, for example crude potassium salt can be separated into its components, whereby field strength can reach 14 kV/cm without sparkover. Since the strength of the electrostatic field in the free-fall separator in accordance with the present invention is increased to approximately three times the strength of conventional free-fall separators, the falling height of the separating material in the free-fall separator in accordance with the present invention can be considerably reduced without decrease in the separating action as compared with the conventional free-fall separators.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
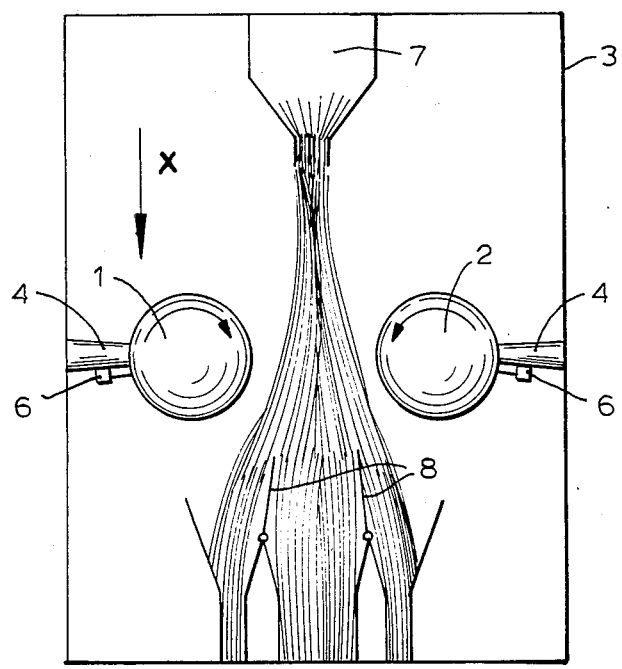
FIG. 1 is a view showing an electrostatic free-fall separator in accordance with the present invention.
Figure 2:
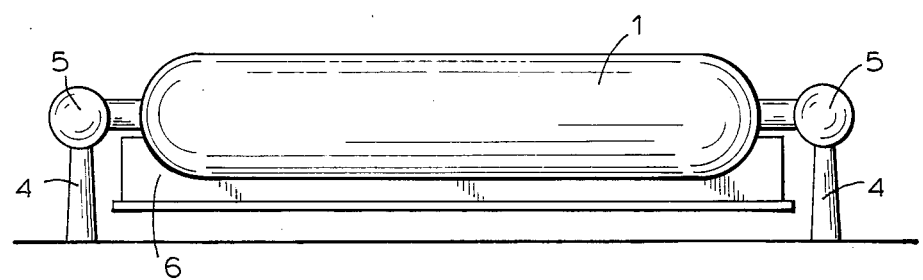
FIG. 2 is a view showing a roller-shaped electrode of the inventive electrostatic free-fall separator, as seen in the direction of the arrow X.

An electrostatic free-fall separator for separating mixtures of materials having low electrical conductivity, particularly mineral material mixtures, has a housing which is identified with reference numeral 3. Two roller-shaped electrodes identified with reference numerals 1 and 2 are arranged in the housing 3 and supported in the housing rotatable in directions identified with the arrows. The roller-shaped electrodes 1 and 2 are driven in rotation by a drive which is not shown in the drawing.

The electrodes 1 and 2 have shafts. Bearings for the shafts of the electrodes 1 and 2 are supported in metallic supports which are identified by reference numeral 4. The support 4 for the bearings are composed of an insulating material. The bearings are also provided with corona-protective devices 5.

An electrical field is formed between the electrodes, and between in particular their surfaces facing toward one another. Stripping elements of stripping devices identified with reference numeral 6 abut at the surfaces of the electrodes and more particularly at their surfaces facing away from the electrical field formed between the electrodes. The stripping elements strip off the dust adhering to the surfaces of the electrodes.

The mixture to be separated is supplied into an inlet device for the separating material 7, which is identified with reference numeral 7. From the inlet device 7 the mixture flows into the electrostatic field generated between the electrodes 1 and 2.

Separating tongues or flaps 8 are located below the electrodes 1 and 2. The stream of separating material which has been separated in a spread-like manner is subdivided with the aid of the separating tongues 8 into fractions in which respective components of the separating material are enriched. The thus enriched fractions flow to the respective compartments, wherein the intermediate material flows between the compartments, as can be seen in FIG. 1.

It will be understood that each of the elements described above, or two or more together, may also find a useful application in other types of constructions differing from the types described above.

While the invention has been illustrated and described as embodied in an electrostatic free-fall separator, it is not intended to be limited to the details illustrated herein, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An electrostatic free-fall separator for separating mixtures of materials having low electrical conductivity, particularly mineral material mixtures, the electrostatic free-fall separator comprising inlet means for feeding a material to be separated; outlet means for withdrawing the material after having been separated and including separating flaps located underneath said inlet means; means for separating the material, located between said inlet means and said outlet means and including at least two rotatable roller-shaped field electrodes arranged parallel to and at a distance from one another and generating a substantially horizontally directed electrical high-voltage field, said roller-shaped field electrodes being formed as cylindrical hollow bodies having a predetermined diameter, two ends formed as semi-spherical caps without edges and of one-piece with a remaining portion of the same hollow body, and horizontally directed longitudinal axes located at the same height parallel to one another, said hollow bodies which form said electrodes being spaced from one another by a relatively small distance which is at most equal to the diameter of said electrodes; and stripping means arranged outside of the electric field generated between said field electrodes.

2. An electrostatic free-fall separator as defined in claim 1, wherein said separating flaps are arranged underneath said field electrodes.

3. An electrostatic free-fall separator as defined in claim 1 wherein said electrodes are mounted on metallic mountings having bearing and driving elements which are provided with corona-protective means.

4. An electrostatic free-fall separator as defined in claim 3, wherein said metallic mounting, bearing and driving elements are arranged in connection with said hollow bodies which form said field electrodes.

5. An electrostatic free-fall separator as defined in claim 3, wherein said metallic mounting, bearing and driving elements are located in the region of the electrical field.

6. An electrostatic free-fall separator as defined in claim 1, wherein said stripping means abuts against said hollow bodies and additionally against said semi-spherical caps of both ends of said hollow bodies of said electrodes.

* * * * *